April 4, 1944.  L. M. C. SEAMARK  2,346,051
PIPE AND OTHER COUPLINGS
Filed Aug. 3, 1942  5 Sheets-Sheet 1
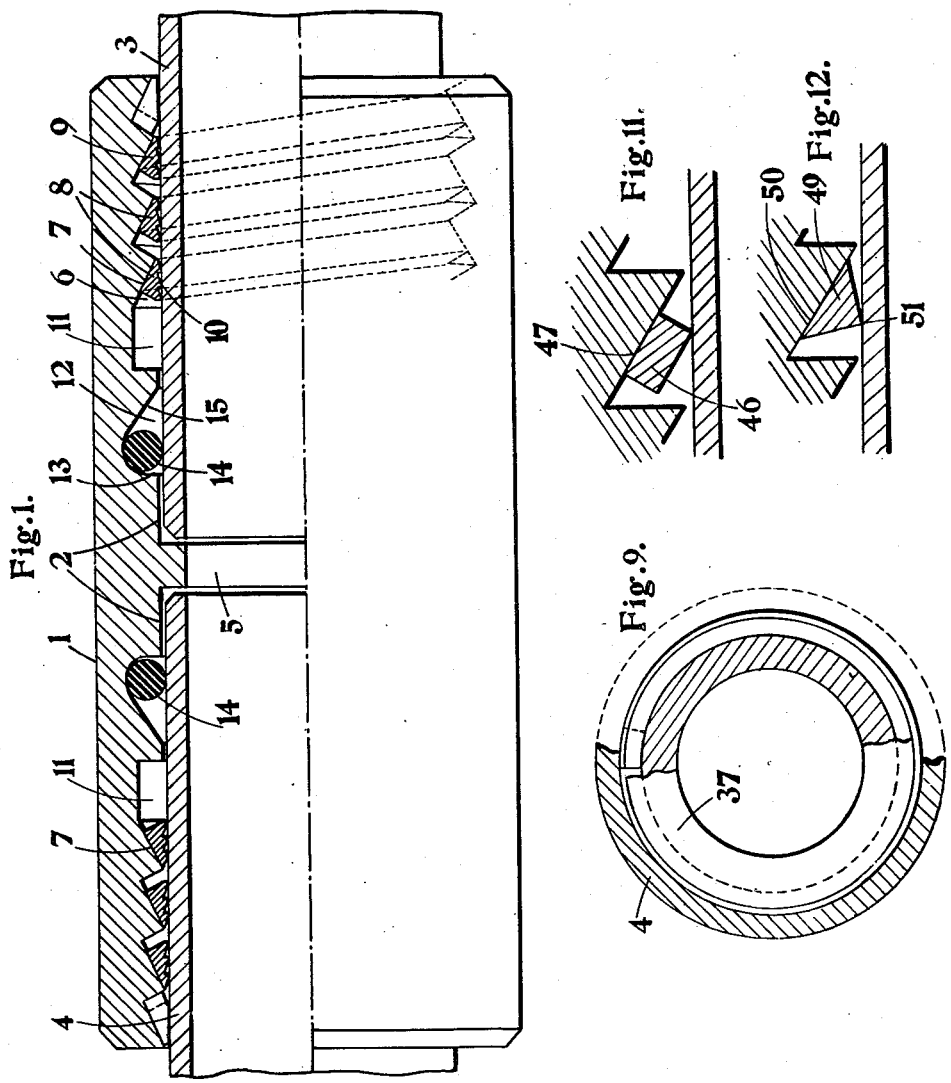
Inventor
L. M. C. Seamark:
by
W. E. Evans
Attorney.

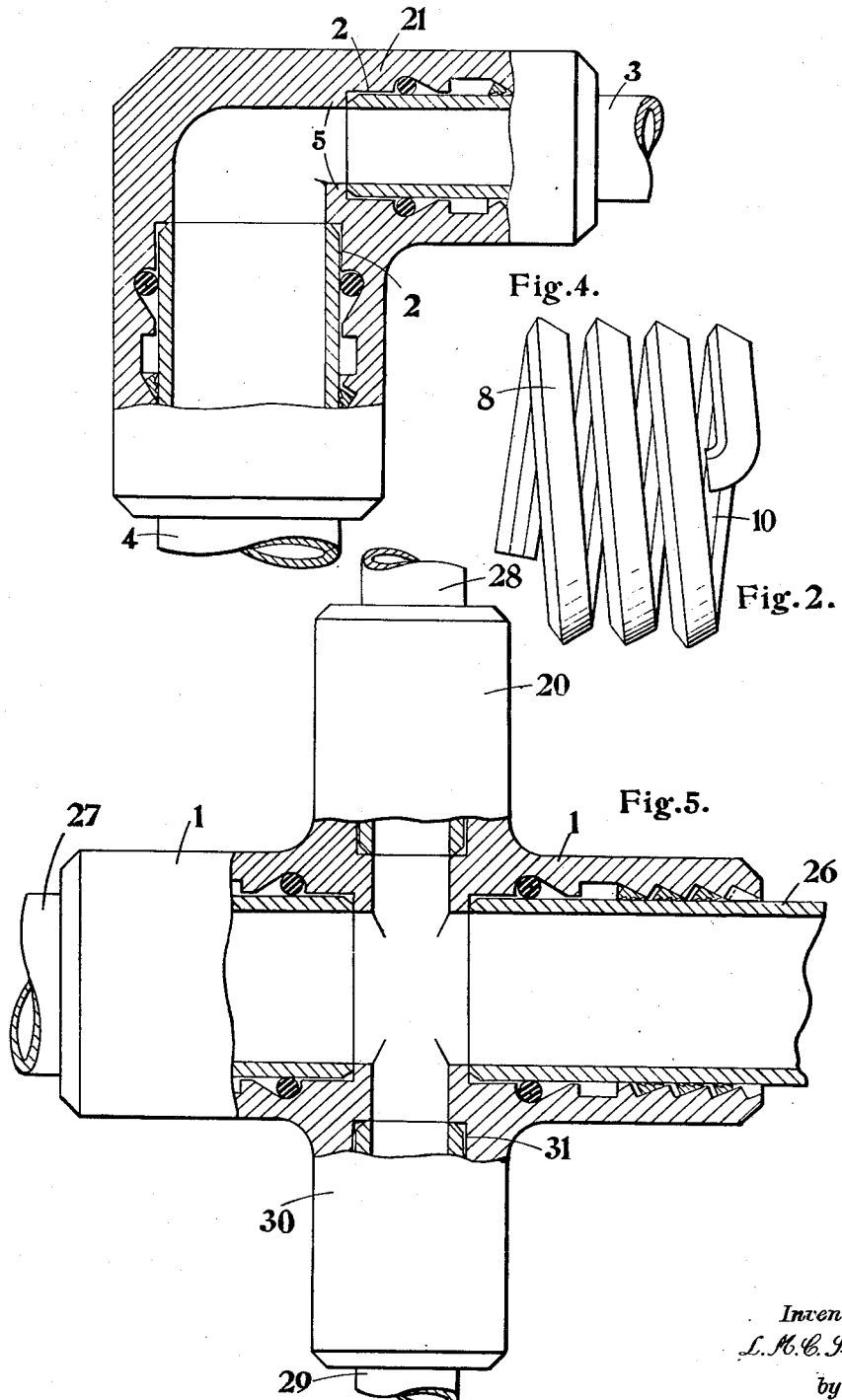

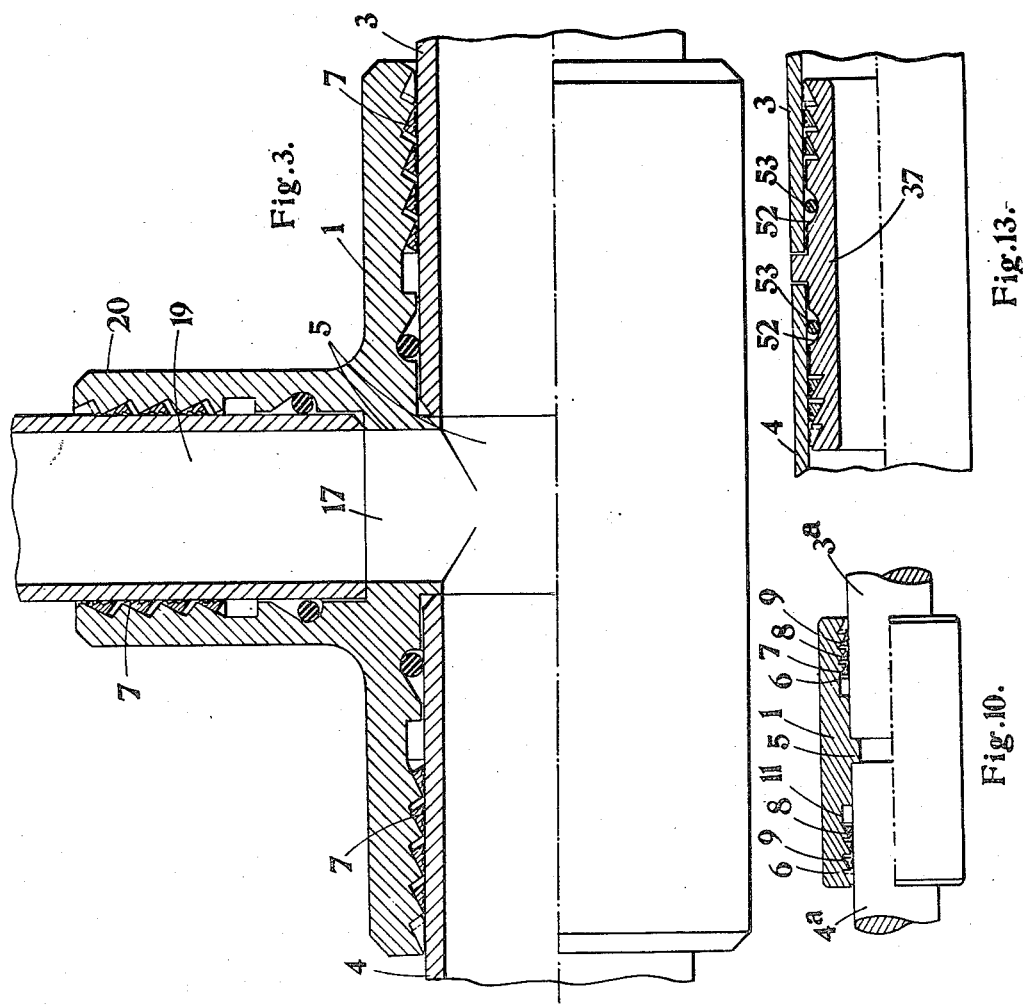

April 4, 1944.   L. M. C. SEAMARK   2,346,051
PIPE AND OTHER COUPLINGS
Filed Aug. 3, 1942   5 Sheets-Sheet 4

Inventor
L. M. C. Seamark
by
W. E. Evans
Attorney.

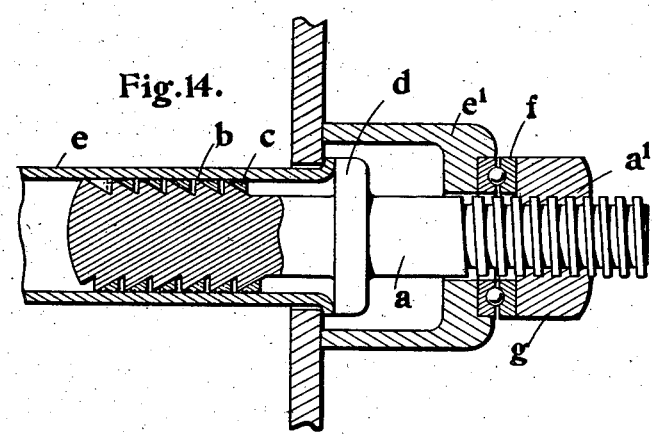
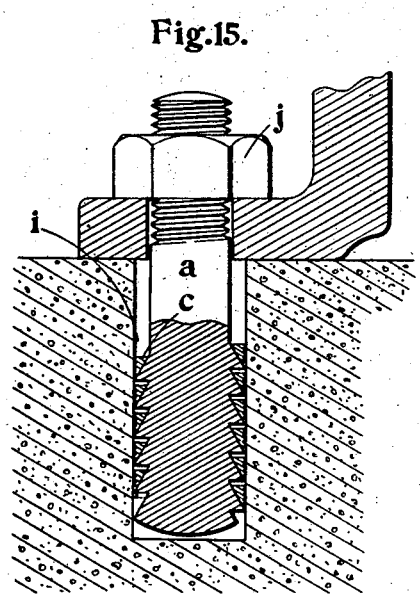
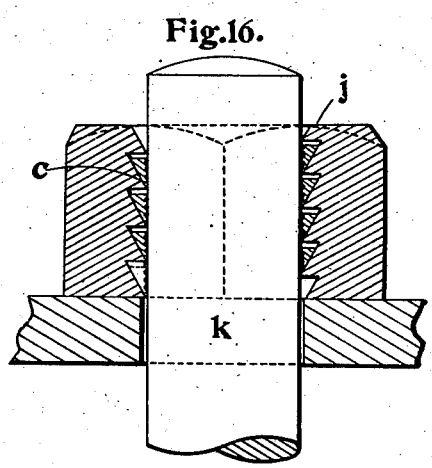

Patented Apr. 4, 1944

2,346,051

UNITED STATES PATENT OFFICE 2,346,051

PIPE AND OTHER COUPLING

Lewis Mervyn Cecil Seamark, Pyne Cliff, Lyme Regis, England

Application August 3, 1942, Serial No. 453,385
In Great Britain June 16, 1942

12 Claims. (Cl. 285—193)

This invention relates to fastenings, connections and couplings of plug-and-socket type.

The invention has among its objects to avoid the use of complementary screw threaded parts such as bolts and nuts or of screw threaded connections for the coupling of pipe-line sections or other sectional parts and to provide joints that, while they are highly resistant to wear and to stress, are made of parts that are readily connected and disconnected, and the invention is thus applicable to many purposes for which complementary screw threaded parts are commonly employed.

The invention is also applicable where the coupling instead of serving for the reception within its ends of pipe-line sections or other sectional parts to be connected, serves as an internal plug or as an external sleeve or cap or for the connection together of parts or the ends of parts of tubular, cylindrical or other form or for the closure of receptacles.

The invention is also applicable to couplings or fittings that may have a number of sockets provided, within which the ends of the parts to be connected are held on their mere insertion or on the mere insertion of their ends axially within the ends of coupling sleeves, bushes or the equivalent, and where required fluid-tight joints may be provided without the necessary use of gland rings or nuts.

According to the invention one of the parts to be connected or coupled is provided with a helical thread that is adapted for the reception of a corresponding helix of metal having an elastic characteristic, by which the respective parts are connected or coupled, the convolutions of the helix having for this purpose an interstitial helical space between adjacent convolutions and a contact face for engagement with the part complementary to that upon which the helical thread is provided, and an opposite sliding contact face by which the helix is supported on one flank of the helical thread that is wider than the cross-section of the convolutions, whereby when the helical thread is provided internally of a socket or sleeve, the plug part having an external diameter slightly larger than the normal diameter of the helix at the contact face, the plug part on insertion into the socket causes the expansion of the convolutions of the helix, this being permitted by the convolutions of the helix being adapted to slide outward along the flank of the helical thread on which they are supported, whereby the plug part is thus securely held, being capable of release when desired by axially tapping the socket. Similarly when the helical thread is applied externally on the plug part the convolutions of the helix having a normal diameter slightly in excess of the internal diameter of the socket, are adapted to contract inwardly to a slight extent as the plug is inserted into the socket, this being permitted by the convolutions of the helix sliding inwards on the flank of the thread supporting them that is wider than the cross-sectional dimension of the convolutions.

According to the invention moreover in its application to an external sleeve coupling adapted for the connection of tube or pipe sections or other parts in axial alignment, the sleeve is at a position adjacent its respective ends provided with an internal helical thread that is advantageously a buttress thread, the wider flank of each thread being inclined inward toward the axis of the sleeve and outward toward the end of the sleeve to which the buttress threads are respectively adjacent, the respective threads being provided for the reception advantageously from the respective sleeve ends of a helix having an elastic characteristic and a cross-sectional form such that the convolutions of the helix are adapted to expand in an outward sliding movement of the convolutions of the helix along the wider flank of the buttress thread, on the insertion into the sleeve of the ends of the pipe sections or other parts to be connected, whereby in the inserted position of those parts they are held gripped under the pressure imposed by the convolutions of the helix, the helix contracting inwardly upon the plug part when set within a corresponding helical groove in the socket part.

An abutment flange or the equivalent is advantageously provided for the determination of the positions of the parts to be connected on their insertion from the respective ends of a sleeve within which a helical thread is provided near the respective ends of the sleeve for the reception of a helix. Thus an integral internal abutment flange may be provided in a central position in the length of the sleeve against which the respective ends of the pipe sections or the ends of the other plug parts to be connected may abut on their insertion the ends of the pipe sections on insertion then receding as the helix also recedes on its contraction, whereby the ends of the pipe sections are firmly held.

The bore of the external sleeve at positions beyond those at which the respective helices are nested in the internal helical buttress threads, are provided to seat or accommodate the end of the pipe sections or other parts to be connected.

According to the invention moreover the external coupling sleeve, as for example when employed for the transmission of fluids under pressure, may be provided with an annular channel or channels for the reception of packing at those parts of the bore of the sleeve at which the ends of the cylindrical pipe sections or other parts to be connected are seated.

According to the invention moreover a coupling for the connection of pipe-line sections and for similar purposes may be provided as an internal plug or bush having upon its external periphery two helical buttress threads respectively extending from its opposite ends to a determined position for the accommodation of helices of corresponding form, having an inclined underface adapted to slide upon the wider flank of the buttress threads, the respective convolutions of the helices being adapted on their outer faces for gripping contact with the internal surface of the pipe sections or other parts to be connected.

According to the invention moreover the internal plug or sleeve may be provided with an external integral abutment flange conveniently provided for the accommodation of packing in position between the abutment flange and the respective end faces of the pipe sections or other parts to be connected.

The invention comprises the constructional modifications hereinafter described.

The invention is illustrated by way of example in the accompanying diagrammatic drawings, in which—

Figure 1 is an elevation partly in longitudinal section, of a coupling adapted for the connection of adjacent pipe lengths of the same diameter in alignment, and Figure 2 is a corresponding detail view.

Figure 3 is an elevation partly in longitudinal section, of a T coupling for the connection of the ends of three pipe-line sections.

Figure 4 is an elevation partly in longitudinal section, of an elbow coupling,

Figure 5 is an elevation partly in longitudinal section of a coupling or fitting adapted for the connection of four pipe-line sections.

Figure 9 is a coresponding end elevation, Figure 10 is an elevation partly in section of a coupling for use in the coupling or connection of rods and other solid or tubular parts.

Figures 11 and 12 are detail views illustrating examples of helices of other cross-sectional shape and mounting, adapted for use according to the invention, and Figure 13 is a modification of the construction illustrated in Figure 8, while Figures 14 to 16 show other applications.

Figure 6:
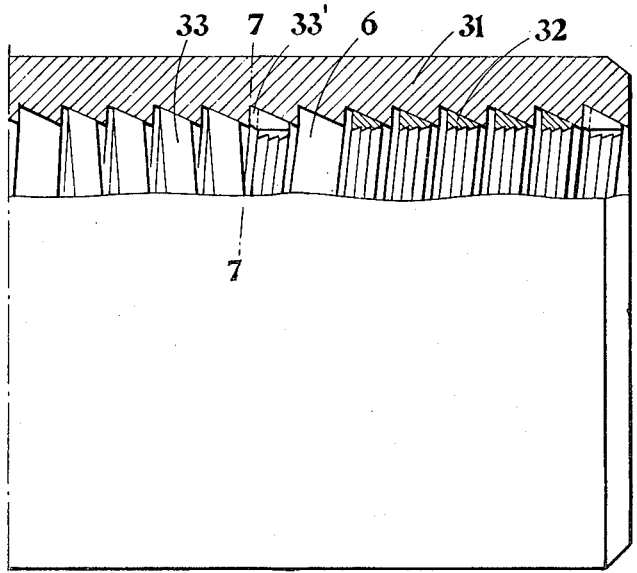
Figure 6 is a partial view of a coupling of modified form.

In carrying the invention into effect as illustrated in Figures 1 and 2 of the accompanying drawings, a cylindrical coupling sleeve 1 is provided in a central position with an integral abutment flange 5 against which the respective ends of the pipe-line sections 3 and 4 may abut on their insertion into the sleeve. By such means two substantially cylindrical spaces are formed within the sleeve for the reception of the pipe-line sections to be connected. At their inner parts there respective spaces are provided as a cylindrical seating 2 within which the end of the respective pipe-line sections 3 and 4 loosely fits. At the opposite end of the respective cylindrical spaces an internal helical buttress thread 6 is formed, the wider flank of each helical buttress thread being inclined inward toward the axis of the sleeve and outward toward the adjacent end of the sleeve, and in an intermediate position between the integral abutment flange 5 and the end of the buttress thread, an annular clearance space 11 is provided; and in the seatings 2 an annular channel 12 for the accommodation of joint packing is provided, the innermost part 13 of which has a curvature for the accommodation of the packing ring 14, while the part 15 of the cavity is inclined downward towards the axis of the sleeve. The packing 14 is subject to the pressure of the fluid conveyed in the pipeline in which the sleeve 1 may be connected; so that the packing is thus applied with pressure against the inclined face 15. The packing 14 is advantageously made of india rubber or of fabric in which india rubber is incorporated or rubber substitute or other flexible packing material or composition not affected by the fluid conveyed.

The internal buttress threads 6 are adapted for the admission from their respective ends of an open helix 8 of steel or other metal or alloy having an interstitial helical space between adjacent convolutions and an elastic characteristic. The helices 8 have a normal diameter slightly smaller than that of the pipe-line sections or other parts 3, 4, whereby on the insertion of the ends of the pipe-line sections 3 and 4 into the positions determined by the abutment flange 5, the convolutions of the helices are expanded, whereby they slide outward on the flanks 7 that are wider than the outer contact faces of the helices. The helices 8 are formed of a substantially triangular cross-section, the widest face of the cross-section being the inner face which is roughened, serrated or otherwise prepared for imposing a substantial amount of friction on the inserted end of the pipe-line sections, so that thus on the inserted pipe-line sections contacting with the abutment flange 5 the helices 8 contract and recede axially on the wider flank 7 of the helical threads whereby the pipe sections 3 also recede and the helices 8 at the inner serrated faces 10 thus grip the respective pipe line sections. The access of fluid under pressure through the clearance spaces between the pipe-line sections and the abutment flange 5 serves also to impose pressure upon the packing for the maintenance of a tight joint.

It will be understood that in the manner indicated the pipe-line sections are firmly held in position by the sleeve 1 and that the pipe-line sections may be readily released on the sleeve being axially tapped with a hammer, or the sleeve rotated.

It is of advantage that the outer ends of the respective helices be bent back as illustrated in Figure 2 towards the short flank of the helical thread and thus maintain the helix or helices normally in the forward position.

Figure 3 illustrates a T coupling in which the parts or sockets 20 of the coupling are equipped in a manner similar to the respective ends of the sleeve illustrated in Figure 1, excepting that by reason of the disposition of the respective inserted three pipe-line sections, the abutment flange 5 is modified in width to adapt the part 17 of the bore for the reception of the pipe-line section 19 in the socket 20.

Figure 4 illustrates an elbow or angular coupling or fitting 21, the respective parts of which are constructed in the manner described with reference to Figure 1, except that the coupled pipe-line sections are of different diameter and the respective ends of the coupling are disposed in angular relation. Thus the seatings 2 for the pipe sections 3 and 4 are disposed at an angle of 90°, and the respective ends of the seatings serve to form abutment faces for the ends of the respective pipe-line sections 3 and 4.

Figure 5 illustrates a coupling or fitting having four sockets for the pipe-line sections 26, 27, 28 and 29, set apart at angles of 90°, the construction being similar to that of the T coupling or fitting illustrated in Figure 3, except for the additional socket 30 serving for coupling a further pipe-line section. Thus such a coupling may be provided with sockets of any number desired, applied upon a main conduit, tank or in any other situation.

Figure 7:
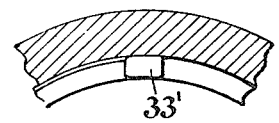
Figure 7 is a corresponding detail view.

In couplings, particularly those of large size where a considerable number of convolutions of the helices are required or where the wall thickness of the pipe sections to be connected are thin, the helices may be provided of two or more lengths and of a small cross-section. Thus as illustrated in Figures 6 and 7, a sleeve 31, only part of which is shown in section, is provided with a considerably extended length of the buttress thread and two helices 32 and 33 are inserted therein. When the helix 33 is applied in position the end is bent forward as at 33' towards or in contact with the short flank of the buttress thread, whereby the helix or helices normally maintain a position to the rear as illustrated in the respective figures.

Figure 8:
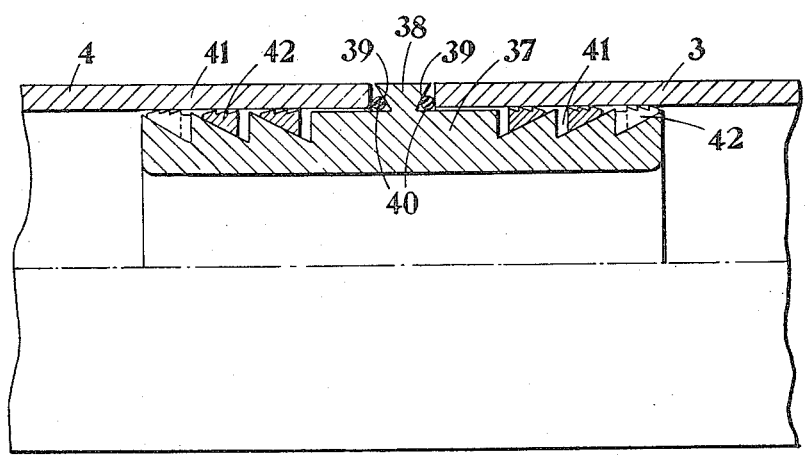
Figure 8 is an elevation partly in longitudinal section of an internal coupling sleeve or plug adapted for the connection of pipe sections in alignment.

In carrying the invention into effect according to the constructions illustrated in Figures 8 and 9, an internal bush or sleeve 37 is provided of such diameter that it is adapted to have a sliding fit within the bore of the pipe-line sections 3 and 4 or other parts intended to be connected. The bush 37 is provided with an external integral abutment flange 38 having a dovetail cross-sectional form, the lateral faces 39 of which form recesses for packing 40 at a position adjacent the lateral faces 39 and the end faces of the respective pipe-line sections. The bush 37 is provided adjacent its respective ends with an external helical buttress thread 41. Helices 42 of steel or other metal having an elastic characteristic have a normal diameter slightly in excess of the internal diameter of the pipe-line sections and the width of the convolutions is substantially less than the width of the wider flank of the buttress thread upon which the helix rests.

In the use of the coupling bush 37 one end of the bush is inserted into the pipe section 3, whereby the convolutions of the helix are contracted. The end of the pipe-line section 4 is then applied over the opposite end of the bush 37, and both pipe-line sections are brought into position to make joints between the lateral faces 39 of the abutment flange 38 and the ends of the respective pipe-line sections. Alternatively, annular packing channels may be provided on the external periphery of the coupling bush 37 in a manner similar to the construction illustrated in Figure 1.

In Figure 10 is illustrated a coupling for connection of solid rod sections, being substantially the same as one half the coupling illustrated in Figure 1, except that no packing is employed. In Figure 10 the parts are numbered to correspond with Figure 1, and the rod sections are indicated 3a and 4a. A plug may be similarly formed of one half part of the coupling bush 37 as represented in Figure 8, the bush being closed at one end or formed solid.

Figures 11 and 12 respectively illustrate modifications of the cross-sections and position on the wide flank of the buttress thread of the helices 46, 49 that are so formed as respectively to lie beneath or upon the wide flank 47 or 50 of the buttress thread. In Figure 11 the cross-section of the helix 46 is rectangular, the helix being formed of a rod of that cross-section to occupy the position indicated in Figure 11, whereby the helix engages the part complementary to that provided with the helical buttress thread in or on which the helix is mounted, at the lower angle of the rectangular cross-section. Similarly the position of engagement of the helix of triangular section illustrated in Figure 12 is the apex 51 of the helix cross-section.

In Figure 13 an alternative construction is illustrated to that indicated in Figure 8, in which however the packing is provided in wide annular peripheral grooves 52 on the bush 37, adapted to receive the packing 53, whereby the pipe-line sections 3 and 4 may be applied over the bush 37 and an effective fluid-tight joint maintained.

In Figure 14 the application of the invention is shown for the removal of boiler tubes. For this purpose a spindle $a$ is provided having formed at one end a helical buttress thread $b$ upon which a steel helix $c$ is applied such as hereinbefore described, the helix having an inclined internal face and a cylindrical external face. An abutment flange $d$ is provided on spindle $a$ for application against the end of the tube $e$ to be removed, while the outer end $a^1$ of the spindle has formed upon it a helical thread advantageously of square cross-section. The spindle $a$ is supported on the boiler plate by an inverted cup-shaped fitting $e$ having a central hole through which the spindle extends, and a nut $g$ is applied upon the outwardly extending end $a^1$ of the spindle, and a ball bearing $f$ mounted on the outer prepared face of the cup-shaped fitting $e$. On the rotation of the nut $g$ the screw-threaded end of the spindle $a$ is drawn out of the tube $e$ and in the operation the helix $b$ is frictionally engaged in the bore and expands whereby such a considerable pressure is imposed within the tube by the helix that the tube is withdrawn.

In Figure 15 the application of the invention to a holding-down bolt is illustrated, in which the bolt $a$ is provided at its lower end with a buttress thread within which a helix $c$ is mounted as shown in Figure 14, the inner face of the helix being inclined to seat upon the wide flank of the buttress thread. The outer face of the helix is advantageously roughened or otherwise prepared for engagement in the hole $i$ that may be drilled in the concrete or other foundation. The upper end of the bolt $a$ may be screw-threaded and may extend through the base of a supporting frame or other part. On the rotation of the nut $j$ the helix $c$ is frictionally engaged in the hole $i$ and the helix is expanded whereby the bolt is tightly held.

In Figure 16 the invention is shown applied for fastening a nut $j$ upon the end of a bolt $k$ in substitution of a complementary screw-threaded connection. The nut $j$ is provided internally with a buttress thread in which the wider flank of the thread is inclined outwardly in an upper direction, and a helix c such as hereinbefore described is mounted in the buttress thread having its inner face roughened or otherwise prepared to impose friction. Thus on the rotation of the nut j the helix c contracts and tightly engages the nut j whereby a firm connection is made. The nut may be removed by rotation.

It will be understood that the spindle a (Figure 14) may be removed from the tube by rotation leaving the helix within. The same applies on the rotation of the bolt a (Figure 15) and of the nut j (Figure 16).

I claim:

1. A coupling or connection of plug and socket type in which one part has formed upon it a helical thread adapted for the reception axially of a helix of metal by which the respective parts of the coupling are connected, the helix having an interstitial helical space between adjacent convolutions, and an elastic characteristic, and its convolutions having a contact face for engagement with the part of the coupling complementary to that upon which the helical thread is formed, and an opposite sliding contact face bearing on one flank of the helical thread that is wider than the cross-section of the convolutions, and leaving a space between the convolutions and the other flank of the thread, in which the expansion or contraction of the helix is permitted.

2. A coupling or connection as specified in claim 1, comprising means for the packing of the joints between the respective parts of the coupling inward of the positions of their connection by the metal helix.

3. A coupling or connection as specified in claim 1, in which the helical thread is formed internally within a sleeve, and an annular clearance space is formed internally of the sleeve at the inner end of the helical thread.

4. A coupling or connection as specified in claim 1, in which the helical thread is formed internally within a socket and in which the plug part complementary to the socket upon which the helical thread is formed, is firmly held under pressure imposed on the contraction of the helix in the insertion of the plug part into the socket.

5. A coupling or connection as specified in claim 1, in which the helical thread is formed externally upon the plug part, and in which the complementary socket or the equivalent is firmly held under pressure imposed by the expansion of the helix on the insertion of the plug part into the socket.

6. A coupling or connection as specified in claim 1, in which the helical thread is a buttress thread and the metal helix is supported upon one flank of the helical thread of greater width than the other.

7. A coupling or connection of plug and socket type as specified in claim 1, in which the helical thread is provided internally of a socket and the complementary plug part has an external diameter slightly larger than the normal internal diameter of the helix at the contact face which directly engages the plug part on its insertion into the socket, the convolutions of the helix being thus adapted on the insertion of the plug part into the socket to slide along the flank of the helical thread on which they bear, whereby the helix is thereby expanded and the plug part firmly held by inward pressure.

8. A coupling or connection of plug and socket type as specified in claim 1, in which the helical thread is applied externally on a plug part and the helix within the helical thread has a normal external diameter slightly in excess of the internal diameter of the socket, the convolutions of the helix on insertion of the plug part into the socket being adapted to slide and recede inward on a flank of the thread bearing them that is wider than the cross-section of the convolutions of the helix, but held expanded whereby the plug is firmly held within the socket.

9. A coupling or connection of plug and socket type adapted for the connection of length sections of parts such as pipe-line sections, the socket at positions adjacent its respective ends having formed within it an internal helical thread, the wider flank of each thread being inclined inward towards the axis of the socket and the respective ends to which the threads extend, the threads being each adapted to accommodate a helix of metal having an elastic characteristic, of a cross-sectional form such that the convolutions of the helix are adapted to expand in a sliding movement along the wider flank of the thread on insertion into the sleeve from the respective ends of a plug part such as the ends of pipe line sections, whereupon the plug parts are held under the pressure imposed on the contraction of the expanded convolutions of the helices.

10. A coupling or connection of plug and socket type adapted for the connection of socket parts such as pipe-line sections, in which the plug part is provided on its external periphery with a screw thread extending from each of its opposite ends, the threads being each adapted to accommodate a helix of metal, the helices having an elastic characteristic and a cross-sectional form generally corresponding to the threads, and a normal diameter slightly more than that of the internal diameter of the complementary sockets or pipe-line sections, the cross-section of the helix having an inclined underface of a width less than the wider flank of the thread upon which the helix is supported, whereby the convolutions of the helix are adapted to move and to contract on the wider flanks of the thread upon which they are supported and firmly to hold the sockets upon the plug part.

11. A coupling or connection of plug and socket type as specified in claim 9, in which means are provided comprising an integral inwardly extending flange for the separation of the socket cavities and for the determination of the extreme inward position to which the plug parts may extend into the sockets of the coupling and from which they may slightly recede out of contact with the said flange as the helix contracts, on insertion of the plug parts, whereby they are firmly held.

12. A coupling or connection of plug and socket type as specified in claim 10, in which the plug part comprises an external integral circular abutment flange of a dovetail cross-sectional shape, at a position between the screw threads, the lateral faces of the flange serving with the end faces of the socket or pipe-sections for the reception of packing by which a tight joint is made between the plug part and the socket or pipe-line sections.

LEWIS MERVYN CECIL SEAMARK.